July 15, 1969　　C. C. TETZLAFF ET AL　　3,454,996
WIRE HOSE CLAMPS
Filed Sept. 19, 1967　　2 Sheets-Sheet 1
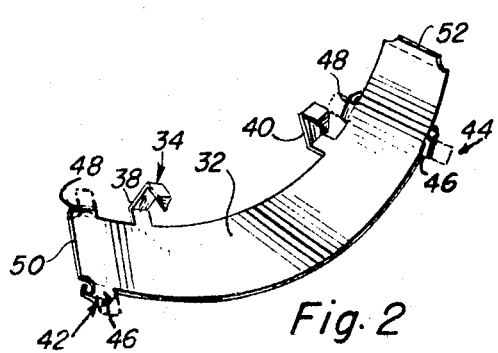
Fig. 2
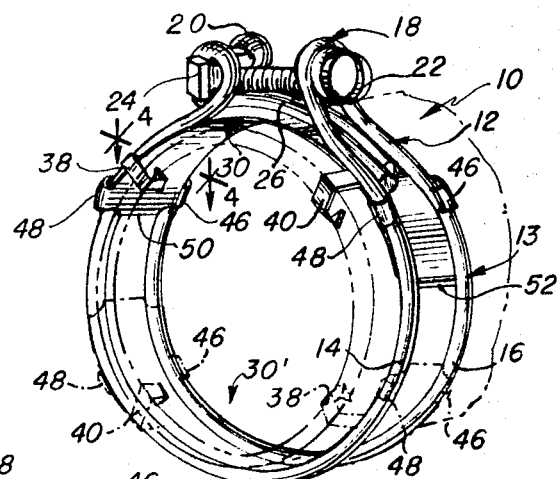
Fig. 4
Fig. 1
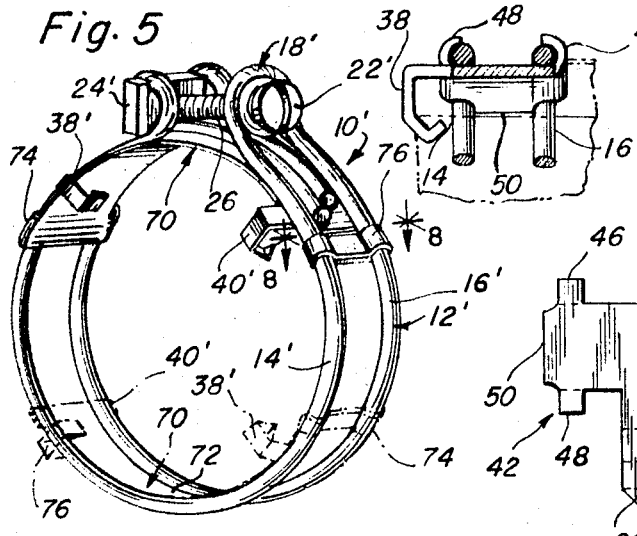
Fig. 5
Fig. 3
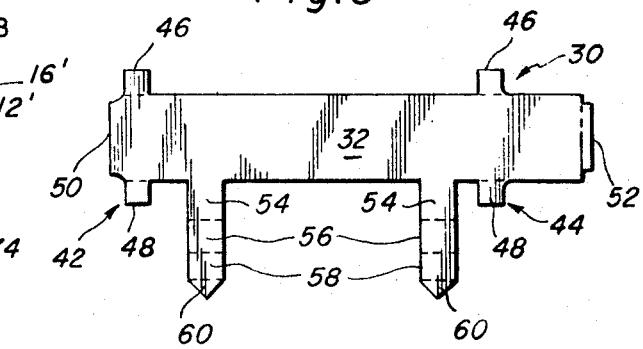
Fig. 7
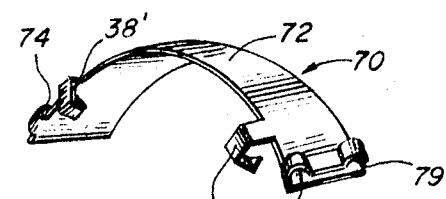
Fig. 6
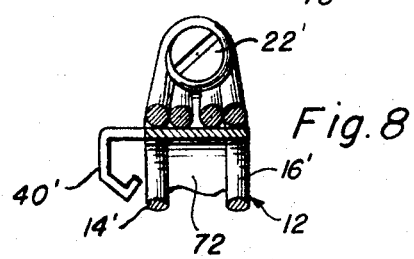
Fig. 8
INVENTORS
CLARENCE C. TETZLAFF
GEORGE CHAMBERLAIN
BY Silverman & Cass
ATTORNEYS

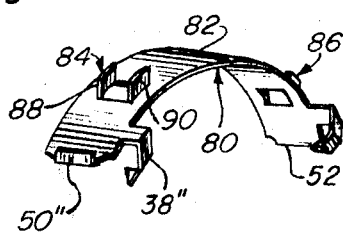
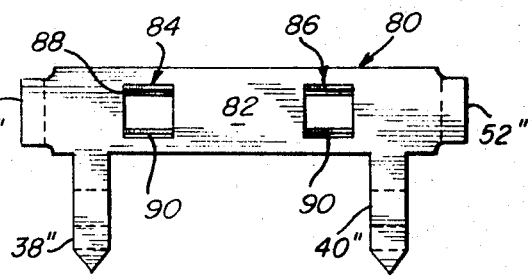
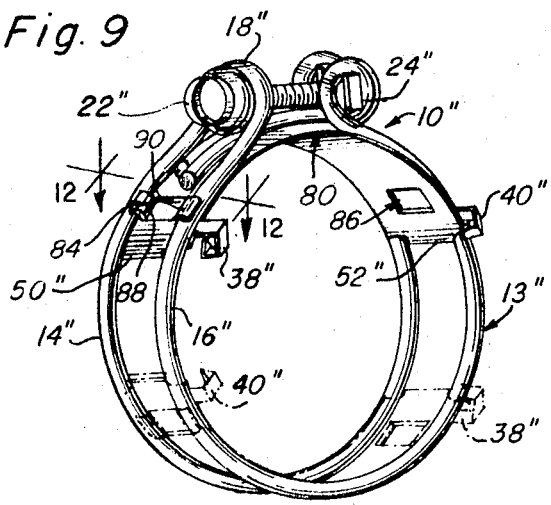
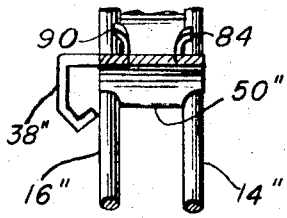
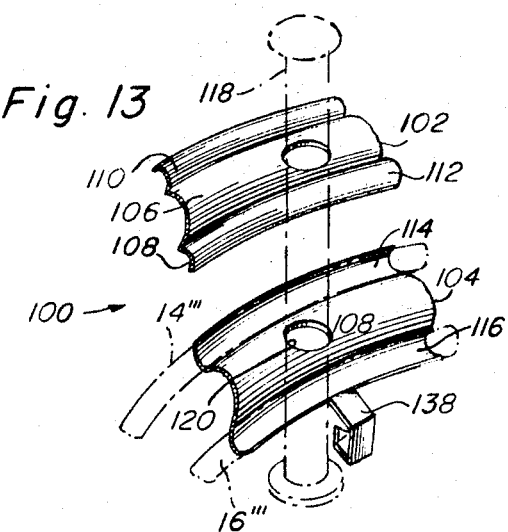
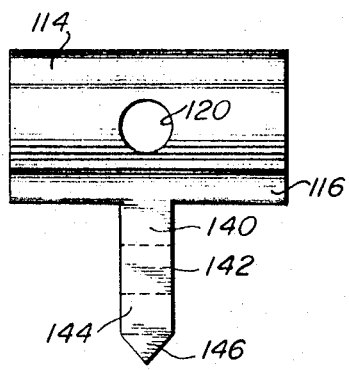
INVENTORS
CLARENCE C. TETZLAFF
GEORGE CHAMBERLAIN
BY Silverman & Cass
ATTORNEYS United States Patent Office 3,454,996
Patented July 15, 1969

3,454,996
WIRE HOSE CLAMPS
Clarence C. Tetzlaff, River Forest, and George Chamberlain, Cicero, Ill., assignors to Wittek Manufacturing Co., Chicago, Ill., a corporation of Illinois
Filed Sept. 19, 1967, Ser. No. 668,788
Int. Cl. B65d 63/00
U.S. Cl. 24—283                                          18 Claims

ABSTRACT OF THE DISCLOSURE

A hose clamp of the type having a tension band formed of a pair of parallel wire strands and having means for constricting same about a hose to secure the hose to a pipe, the hose clamp having a bracket secured on the band along the inner circumference thereof, the bracket having at least one prong extending laterally thereof, the prong including a reverse bent bight spaced from the band by a predetermined distance; the prong having a terminal piercing tip radially to engage the hose interior at a location spaced form the constrictable portion of the band; the bracket generally having means engageable with the parallel wire strands forming the band; the bracket may be provided with bracing means integral with the bracket for maintaining the parallel wire strands spaced apart during the application of the bracket thereto as well as during the application of tension to the hose clamp. In one embodiment, the bracing means comprises upstanding flanges on opposite ends of the band. In another embodiment described, the bracing means is formed as an integral fold-over portion defining portions accommodating the wire strands therethrough and functioning also to secure the bracket to the wire strands. A further embodiment utilizes, as bracing means, upstanding ears formed by slitting the inside of the band and crimped in an outward direction relative the bracket and likewise functioning to secure the bracket to the wire strands.

Cross-reference to related applications

This invention is concerned generally with hose clamp construction having a tension band to which is secured a bracket carrying means thereon to space the hose clamp properly from the end of the hose when the hose clamp is installed thereon for securing hose and hose clamp together prior to use. Earlier applications having some bearing on this application are set forth as follows:

A radial screw hose clamp with a load diffusing member and having simple spacing means integral with the load-diffusing member is disclosed in copending application Ser. No. 549,980, May 3, 1966, now Patent No. 3,389,442, and entitled "Hose With Load Distributing Member." Clarence Tetzlaff, named in the above identified copending application is one of the applicants herein.

A hose clamp with hose attaching means of a structure which enables a hose clamp properly to be secured to and positioned relative to the end of the hose is disclosed in another copending application filed by the same applicants as named herein; Ser. No. 620,473, now Patent No. 3,407,449, filed Mar. 3, 1967 and entitled "Hose Clamp With Hose Attaching Means." The structure of this latter application is characterized by the provision of a wire clip secured to the hose clamp where the clip has one or more sharp prongs axially piercing the end wall of the hose.

Another copending application filed by the same applicants as named herein, Ser. No. 620,472, filed Mar. 3, 1967 and entitled "Hose Clamp With Hose Attaching Means" relates to a hose clamp provided with a bracket having prongs identical with the prongs concerned herein.

All of the above applications, as well as this one, are owned by a common assignee.

The invention herein relates generally to the hose clamp art and more particularly pertains to wire hose clamps having bracket means secured to the tension band thereof, said bracket means including means for securing the hose clamp to the hose at a predetermined location relative to the end of the hose; said bracket means having means for bracing the wire strands forming the tension band in a predetermined spaced relationship during application of the bracket means thereto and during constriction of the clamp.

Background of the invention

The invention herein concerns hose clamps having the band or tension members thereof formed of wire, such as the hose clamp disclosed in U.S. Patent 492,855.

There has been an increasing tendency in the assembly of hose lengths to internal combustion engines, for example, to staple the hose clamp to the hose and so as permanently to position and secure the same. Since jigs or fixtures are provided for this operation, the clamps are required properly to be spaced from the hose ends and the tension applying members such as screws or nuts properly must be oriented circumferentially on a hose for ease of assembly and accessibility. The preassembly technique has increased in acceptability, so that the workman on the assembly line is given a quantity of hose lengths of proper shape and dimension with the clamps already secured thereon in place. The workmen then mount these assemblies between the proper pipe ends or spuds. If the hose lengths are correctly cut and shaped, and likewise, have the clamps secured properly in position, the workmen need only tighten the clamps to effect the assembly. This procedure is advantageous since it eliminates human error in placing the clamps on the hose ends, spacing the clamps properly from their respective ends and orienting them circumferentially to a desired disposition. Thus sources of errors in judgment which result in breakage, leakages, destruction of parts, waste and failures of the connections in ultimate use may be eliminated. The key to such advantageous procedure seems to lie in proper spacing and securement of the clamp relative the hose ends.

Wire hose clamps, as contrasted to those clamps having a flat tension band, have achieved wide acceptability for use in these pre-assemblies described since it is fairly easy to staple the same to the hose because the staple or staples pass on opposite sides of the wire or wires and bite into the hose. Also, wire hose clamps are less expenive than the flat band type hose clamps. However, conventional wire hose clamps provide less pressure area than the band type; are easily shifted from the stapled position during the handling thereof prior to use unless a substantial number of staples is utilized; have a tendency to leak due to the piercing of the walls radially in the pressure areas; and, in constriction of the clamp, the spaced wires forming the band are squeezed together to form a narrowed band constricting the hose so that vulnerability to leakage is an ever-present danger. Further squeezing of the pair of spaced wires tends to make the constricted clamp bite deeply and perhaps, unevenly into the hose with obvious resultant disadvantages.

Accordingly, the principal object of this invention is to provide a wire band hose clamp with means for properly securing the hose clamp on the hose properly spaced from the end of the hose.

Another equally important object of this invention is to provide a wire band hose clamp with means for bracing the spaced wires forming the band of the hose clamp to prevent them from being moved together.

Likewise, it is an object of this invention to provide a wire band hose clamp with means for securing the clamp to the hose in spaced relation to the end thereof and bracing means spacing the wires of the band, said securing and spacing means and said bracing means formed on a single bracket member adapted to be secured to the band of the wire hose clamp.

Another object of this invention is to provide a separate bracket member adapted to be secured to the tension band of a wire hose clamp along the inner circumference thereof, said bracket having means for securing the clamp to the hose end at a predetermined distance relative thereto, said means comprising at least one metal prong extending first outwardly from the edge of the bracket and then inwardly radially thereof with a terminal portion having a sharp tooth end, providing a bight into which the hose end is adapted to be seated and a toothed end capable of being directed radially to engage the inner surface of the hose at a location relative to said hose clamp whereby no portion thereof pierces through or passes into the wall of the hose at the area to which pressure is applied.

A further object of this invention is to provide means securing a wire hose clamp to a hose spaced relative to the end of the hose, wherein said means comprises a bracket including prongs for radially engaging the interior circumference of the hose to fix the position of the clamp on the hose and further including flange means at the end of the bracket and disposable between the pair of wire strands forming the tension band of the clamp so as to keep them properly spaced apart both during application of the bracket to the clamp and constriction of the hose clamp.

Yet another object of this invention is to provide a pronge carrying bracket for attachment to the tension band of a wire hose clamp wherein said bracket carries at least one lateral return-bent extension adapted to be crimped upon the wire strands forming said tension band whereby to fix the spacing between said wire strands.

Still another object of this invention is to provide a hose clamp having a tension band formed of a pair of spaced wire strands, a bracket of arcuate configuration secured along the inner circumference of the band immediately beneath the screw location, said bracket having end flanges disposed between said wire strands and ear means arranged to engage said wire strands, said bracket also including laterally extending prong means integral therewith and formable into a bight spaced from the edge of the hose clamp band by a portion thereof to control spacing of the clamp from the hose end; said prong means having a toothed terminal portion disposed for piercing radially the inner wall of a hose to which the clamp is attached at a location outside the applied pressure area of the tension band.

A further object of this invention is to provide a wire hose clamp which can be secured onto the hose so that it is not readily removed from the finally mounted hose clamp and hose.

Another object of the invention is to provide a wire hose clamp with spacing and securing means which enable economical manufacture and construction of the hose clamp and which may be located anywhere along the inner circumference of the hose clamp.

Other objects and advantages will become apparent from the description of several preferred embodiments which follow in connection with which the attached drawings provide an illustration of same. The same or similar reference characters will be used where practical throughout the various figures to designate the same or equivalent structural elements.

In the drawings:

FIG. 1 is a perspective view of a tangential wire hose clamp constructed in accordance with the invention and illustrated as adapted to be secured on a hose shown in phantom outline.

FIG. 2 is a perspective view of the bottom of the bracket means of the hose clamp of FIG. 1.

FIG. 3 is a plan developed view of the bracket means of FIGS. 1 and 2.

FIG. 4 is a sectional view through the hose clamp of FIG. 1 and in the direction indicated.

FIG. 5 is a perspective view of a tangential wire hose clamp showing another form of the invention.

FIG. 6 is a perspective view of the top of the bracket means of the hose clamp of FIG. 5.

FIG. 7 is a plan developed view of the bracket means of FIGS. 5 and 6.

FIG. 8 is a sectional view through the hose clamp of FIG. 5 taken along lines 8—8 and in the direction indicated.

FIG. 9 is a perspective view showing still another form of the invention.

FIG. 10 is a perspective view of the top of the bracket means of the hose clamp of FIG. 9.

FIG. 11 is a plan-developed view of the bracket means of FIGS. 9 and 10.

FIG. 12 is a sectional view through the hose clamp of FIG. 9 taken along the lines 12—12 and in the direction indicated.

FIG. 13 is an exploded fragmentary view showing yet another form of the invention.

FIG. 14 is a planned developed view of the lower bracket member which is illustrated in FIG. 13.

Description of preferred embodiments

Referring now to the drawings, in FIG. 1 the invention is illustrated as embodied in a wire type hose clamp 10 formed of a single length of wire bent upon itself to form a looped body 12 adapted substantially to encircle a hose (phantom outline), said body 12 being bent centrally to form a ring-like tension band 13 consisting of a pair of parallel arranged wire strands 14 and 16 and having opposite end eye formations 18 and 20. Fastening means formed of screw 22 and nut 24 are mounted in said eye formations 18 and 20 respectively, the clamp 10 being tightened by drawing up the fastening means 22, 24 to bring the end eye formations closer together and thus reducing the diameter of the tension band 13. The clamp 10 also includes a free end extension 26 from eye formation 20 serving to bridge the space between the said end eye formations 18, 20, underlying the fastening means 22, 24 to complete encirclement of the hose.

Bracket means generally designated by reference character 30 is secured to the inner circumference of the tension band 13 by securement onto the wires 14 and 16. The bracket means 30 preferably is secured immediately under the fastening means 22, 24, straddling the eye formation 18 and 20 (as represented in solid lines). In this position, rotation of the clamp is prevented while the fastening means are operated to constrict the band. However, the bracket means 30 also is capable of being secured anywhere along the inner circumference of the band 13, as shown by the bracket means 30′ illustrated in phantom outline located diametrically opposite the screw location.

Bracket means 30 is formed as an arcuate generally flat band 32 formed to occupy a cylindrical plane similar to that of the tension band 13 and having spacing and securing means 34 for the clamp formed integral therewith by providing laterally extending prongs 38 and 40. Ear pairs 42 and 44 respectively are formed of tabs 46 and 48 extending laterally of the band 32. Flanges 50 and 52 are provided at opposite ends of bands 32, each of said flanges having a length less than the width of band 32 and selected equal to the minimum distance desired between the wire strands 14 and 16 of tension band 13. When the bracket means 30 is installed onto the clamp 10, the tabs 46 and 48 are return bent, curled over or crimped to engage the wires 14 and 16, one ear pair 42 located on the band side of the eye formation 20 while the other ear pair 44 is located on the band side of eye formation 18, spaced circumferentially from the free ends of bridge extension 26, so that the bracket means 30 is located immediately beneath the screw location. The respective flanges 50 and 52 thus are disposed between wire strands 14 and 16 of band 13.

As shown in FIG. 3, there are four integral but separately functioning parts making up each of extensions 38 and 40. The parts 54 closest to the bracket band 32 function as spacing portions. These determine the distance that the free edge of the band 12 will be spaced from the end of the hose parts 56. Each represents the thickness of the hose, as these parts will be engaged flat against the free end of the hose when installed.

The next parts 58 are of a length slightly less than the parts 56. When the hose clamp is manufactured and prior to its being secured to the hose, these parts 58 are bent at an angle greater than 90° relative to the parts 56. Parts 54 and 56 are at right angle to one another and the bracket band 32, which plane of course is cylindrical. Prongs 38 and 40 terminate in sharp teeth 60 bent at right angle relative to parts 58. The angle between the parts 58 and 56 preferably is great enough so that the hose clamp 10 is slipped over the end of the hose (phantom) so the teeth 60 will clear the inside wall of the hose.

When the hose clamp 10 is secured to the hose with the axial and of the hose wall bottomed against the portion 56, the spacing of the hose clamp edge from the end of the hose is fixed. Thereafter, the parts 58 are pressed inwardly by means of any suitable tool causing these parts to rotate in a counter-clockwise direction as viewed in FIG. 4 with the teeth 60 biting into and entering the inner circumferential wall of the hose. Thereafter, the hose with the hose clamps secured at opposite ends thereof may be handled readily without any danger of changing the orientation of the hose clamps relative to the hose or changing the spacing of the hose clamp relative to the hose ends. It will be seen that the length of parts 54 is greater than the length of portions 58 so that when the teeth 60 either pierce or pass through or otherwise engage the inner wall of the hose, the teeth 60 do not enter the area at which pressure by the tension band is applied. Hence, the likelihood of leakage or damage to the hose is reduced and an assurance exists that once the hose is removed and replaced, the hose clamp will not contribute to a weakening of the hose or even a tendency to leak.

It has been found conventionally that there is a tendency for wire strands 14 and 16 to be moved closer together during constriction of the clamp 10. This tendency to axial movement also may occur when the tabs 46 and 48 are bent, curled and crimped to form ear pairs 42 and 44. To obviate this occurrence, the invention may provide bracing means, in this instance, comprising flanges 50 and 52 at opposite ends of the bracket band 32. These flanges 50 and 52 are arranged between the wire strands 14 and 16 when the bracket means is installed on the tension band 13. The length of the flanges 50 and 52 is less than the width of band 32 and is selected to equal the minimum spacing desired between wire strands 14 and 16.

Referring to FIG. 5, the bracket means 70 is employed on hose clamp 10' in the form of a bracket band 72. Bracket band 72 differs from a bracket band 32 by having strips 74 and 76 formed as lateral extensions thereof co-directional with prongs 38' and 40', the latter being identical to prongs 38 and 40 of bracket 32.

The bracket 70 is shown installed immediately beneath the screw location and secured upon band 13' by return bending strips 74 and 76 upon the bracket and crimping same upon the wire strands 14' and 16'. Either before or during the crimping stage, arcuate portions 78 and 79 are formed in strips 74 and 76 to provide wireways for holding the wire strands 14' and 16' of band 13' in proper spaced relation one to the other. The construction of prongs 38' and 40' are identical to prongs 38 and 40 described earlier herein. Here the means for bracing the wire strands apart function as well as to secure the bracket to the tension band of the clamp. Bracket 70', in phantom, is disposed at another location on band 13.

Referring to FIG. 9 the wire hose clamp 10" shown is identical to clamps 10 and 10' except for use of a different form of bracket means. Bracket 80 of clamp 10" also is formed as an arcuate band 82 but has ear pairs 84 and 86 formed by splitting the band 82 longitudinally at spaced locations thereon so that the tabs 88 and 90 of each pair 84 and 86 can be bent outwardly of the band 13" instead of inwardly as illustrated in the clamp of FIG. 1. Additionally, when the tabs 88 and 90 bent over the wire strands 14" and 16", they also serve a dual function, i.e., as bracing means for maintaining the proper spacing between the wires 14" and 16" and as securing means for attachment of the bracket 80 to the wires 14" and 16" forming band 13" of the hose clamp 10". The flanges 50" and 52" may be utilized to supplement the bracing effect of ear pairs 84 and 86, if desired.

In the event that it is not desired to utilize a hose clamp as shown in FIGS. 1, 5 and 9, which include bracket means 30, 70 or 80, a clip 100 may be formed of sheet metal. As seen in FIG. 13, clip 100 is formed of upper and lower members 102 and 104 formed with curved surfaces 106 and 108 respectively; longitudinal curved portions 110 and 112 being formed on the upper member 102 and curved portions 114 and 116 being formed on the lower portion member 104. The curvature of portions 114 and 116 is opposite to the curvature of portions 110 and 112 so that a "wire-way" is defined between the facing surfaces thereof along the length of the clip 100 when the parts 102 and 104 are brought together. The wires 14''' and 16''' forming the tension band 13''' are arranged to rest on portions 114 and 116 of lower member 104. The member 102 is assembled over the lower member 104 and secured thereto by means of a rivet 118 or screw or any similar fastening means accommodated through suitable perforations, such as perforation 119 in upper member 102 and perforation 120 in lower member 104.

The lower member 104 has a prong member 138 extending laterally of portion 116. Looking at FIG. 14, prong 138 has parts 140, 142, 144 and 146 identical in structure and function to the equivalent constituent parts of prongs 38 and 40 as described above.

Although the bands 32, 72 and 82 are described as generally flat, the invention contemplates the use of a longitudinally curved band wherein edge portions thereof may function as bracing means to maintain the proper spaced relation of the wire strands. Likewise, the applicants contemplate ears which may be disposed in pairs spaced along one edge or on opposite edges, aligned or offset one from the other, and which may be utilized to secure the bracket means to the hose. While the prong means 34 has been showed as formed integral with said bracket means, formation of the prong as a separate member permanently secured to the bracket means also is contemplated herein.

It should be noted that the location of the bracket means is chosen to be below the screw location so that the bracket may serve as a bridge between the ends of the band. This is preferable since in taking up the screw of a tangential hose clamp to constrict same there is a tendency normally for circumferential movement relative to the hose. However, it has been found that location of the bracket means diametrically opposite the screw location or anywhere along the circumference of the band is satisfactory. (See phantom representation.)

Conventionally, the hose of the type normally used in automobile and truck engines is formed of a rubber like material reinforced with fabric, wire and sometimes includes preformed spring support on the interior thereof. Since most internal combustion engines presently are manufactured on high-speed production lines hoses are cut to length and shaped as necessary and furnished to the workmen on the assembly line for engagement between a pair of pipe ends or spuds. The workmen in the past had a plurality of hose clamps and in the installation of the hose, it was necessary to mount the hose clamp on each end, secure the hose to the slot at both ends and adjust the clamps to proper position. The last step was tightening of the clamp.

The above described procedure obviously depends upon the judgment and skill of the workmen and hence furnishes a source of error. The hose clamp must be spaced properly from the end of the hose in order to engage the pipe end so that the necessary pressure may be applied and likewise must be oriented circumferentially of the hose so that the fastening device is acceptable once the assembly of the engine has been completed. It is also important that the pressure of the clamp be applied at a particular area relative to the spud to which the hose is attached. This location is selected so that tension is not applied too close to the open end of the spud or too close to the inner end of the spud. It has been established that the clamp's pressure band should not be contracted so as to bite into the hose over a narrowed area.

Accordingly, the embodiments of the invention described provide wire hose clamps which have means properly spacing the clamp from the axial end of the hose thereby assuring its securement over the proper pressure area and likewise, assuring proper orientation of the fastening instrumentality of the hose clamp so that access is permitted subsequent to assembly of hose onto the engine spud as and as well, may have means to assure maintenance of proper band width.

What is desired to be secured by Letters Patents of the United States is:

1. A hose clamp having a generally circular tension band formed of a pair of spaced substantially parallel wire strands, bracket means secured to said tension band along its inner circumference and lying in the general plane of said tension band thereof, hose piercing means on said bracket means for spacing and fixedly securing said hose clamp to a hose at a predetermined location spaced from an end of the hose to prevent inadvertent rotation of said clamp relative said hose.

2. A hose clamp as claimed in claim 1 and bracing means on said bracket means for maintaining said wire strands spaced apart a predetermined distance during securement of the bracket means thereto and subsequent constriction of the clamp on a hose.

3. The hose clamp as claimed in claim 2 in which said bracket means is an arcuate bracket band and said bracing means comprises ear pairs formed in said bracket band spaced from the edges thereof and bent outwardly relative to the bracket band, each said ear pair consisting of tabs spaced apart a distance equal to said predetermined distance.

4. The hose clamp as claimed in claim 3 and bracing means integral with said bracket means for establishing a minimum spacing between the wire strands of said tension band.

5. The hose clamp as claimed in claim 1 in which said bracket means comprises an arcuate band member and spaced ears integral with said band member and arranged to engage said tension band.

6. The hose clamp as claimed in claim 1 in which said bracket means comprises a substantially flat band and spaced ear pairs on the said band extending laterally of the band edge in an axial direction and are adapted to be returned bent toward said band to engage said wires.

7. The hose clamp as claimed in claim 6 in which at least one ear pair is located adjacent one of the opposite ends of said band.

8. The hose clamp as claimed in claim 6 in which said ear pairs are spaced from the respective opposite ends of said band and bracing means comprising at least one upstanding flange formed along one of said opposite ends of the band, said flange having a length less than the width of said band and selected to equal the minimum desired spacing between said wire strands, said flange being arranged between said wires in installed condition of said bracket means thereupon.

9. The hose clamp as claimed in claim 1 and bracing means comprising a pair of return bent lateral extensions formed on said bracket means adjacent opposite ends thereof each adapted to be engaged over said tension band and crimped thereupon to form a pair of spaced arcuate portions defining, with the bracket means, spaced wire ways accommodating said wire strands respectively therethrough.

10. The hose clamp as claimed in claim 1 in which ear means are formed laterally extending axially of said bracket means, said ear means being arranged in pairs to be return bent upon the wire strands to secure the bracket means thereupon and said hose piercing means being located between the ear pairs.

11. The hose clamp as claimed in claim 1 in which said bracket means comprises a generally flat bracket band formed substantially to conform to the plane of said bracket band, each ear pair comprising return bent with the bracket band along the longitudinal edges of said bracket band, each ear pair comprising return bent tab members engageable with said wire strands, and at least a portion of said hose piercing means being located between said ear pairs.

12. The hose clamp as claimed in claim 11 and bracing means comprising at least one flange formed integral with said bracket band at one end thereof, the length of said flange being selected equal to the minimum desired spacing between the wire strands, said flange being disposed between said wire strands in installed condition of the bracket band thereupon.

13. The hose clamp as claimed in claim 1 in which said hose piercing means comprises at least one prong having one part connected with and lying in the plane of said bracket means and having a radially inwardly extending generally right angle bent part connected to said one part and spaced from the band edge by a predetermined distance, the radial length of the right angle bent second part being substantially the thickness of the wall of the hose to which the clamp is adapted to be secured, said prong also having a third part connected to said second part as a continuation thereof but bent at an angle thereto and extending in a direction toward the tension band edge so that the second part forms a bight between the first and third parts and a terminal part formed as an extension of said third part at generally right angle thereto in a direction radially outward of the hose clamp and having a sharp point, the angle between the second and third parts being substantially greater than 90° to enable the hose clamp to be engaged in the bight but adapted to be decreased so as to drive the sharp point of the fourth part into the inner wall surface of the hose in a radially outward direction to secure the clamp to the hose.

14. The hose clamp as claimed in claim 13 in which the length of the first part is greater than the length of the third part so that the point of the fourth part will engage the hose to which the clamp is adapted to be secured at a location outside of the area of the hose which will be directly beneath the band when the clamp is secured thereupon.

15. The hose clamp as claimed in claim 1 in which said bracket means comprises a pair of clip members arranged to be secured juxtaposed onto the tension band sandwiching same, said clip members each having spaced longitudinal formations together defining wireways, said wire strands being accommodated within said wireways and fastening means arranged between said wireways for securing said clip members one to the other.

16. The hose clamp as claimed in claim 1 in which said bracket means comprises an arcuate flat bracket band and said hose piercing means comprises a pair of prongs spaced along a common longitudinal edge of said bracket band.

17. The hose clamp as claimed in claim 16 and bracing means comprising a pair of lateral extensions near the ends of said band, said extensions each having a pair of spaced arcuate formations and said extensions being adapted to be return bent over the bracket band to sandwich the wire strands therebetween with the arcuate formations opening toward the bracket band to define spaced wireways and the wire strands of the tension band disposed within said wireways.

18. The hose clamp as claimed in claim 17 in which the said extensions are codirectional with said prongs.

References Cited

UNITED STATES PATENTS

| | | | |
|---|---|---|---|
| 1,304,546 | 5/1919 | D'Arcy | 24—283 |
| 1,815,145 | 7/1931 | Embree | 24—283 |
| 2,651,094 | 9/1953 | Dodge | 24—279 |
| 3,365,218 | 1/1968 | Denyes | 285—253 |

FOREIGN PATENTS

| | | |
|---|---|---|
| 541,613 | 12/1941 | Great Britain. |
| 737,139 | 9/1955 | Great Britain. |
| 791,762 | 3/1958 | Great Britain. |
| 951,712 | 3/1964 | Great Britain. |

DONALD A. GRIFFIN, Primary Examiner

PO-1050
(5/69)

UNITED STATES PATENT OFFICE
CERTIFICATE OF CORRECTION

Patent No. 3,454,996      Dated July 15, 1969

Inventor(s)  Clarence C. Tetzlaff and George Chamberlain

It is certified that error appears in the above-identified patent and that said Letters Patent are hereby corrected as shown below:

Column 1, line 22, "form" should read --from--.
Column 1, line 55, after "Hose" read --Clamp--.
Column 2, line 23, "hose and" should read --hose end--.
Column 5, line 29, "and" should read --end--.
Column 6, line 16, after "90" read --are--.
Column 6, line 72, "representation" should read --representations--.
Column 8, line 18, after "pairs" read --and each pair adapted--.
Column 8, line 25, this line should read --said tension band and spaced ear pairs formed integral--.
Column 8, line 55, after "engaged" read --over a hose end with the axial end of the hose engaged--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents